United States Patent Office 2,911,295
Patented Nov. 3, 1959

2,911,295

METHOD OF CONDITIONING SOIL FOR AGRICULTURAL PURPOSES

Charles Peter, Salt Lake City, Utah, assignor to Lydia H. Peter

Application November 10, 1952, Serial No. 319,777

5 Claims. (Cl. 71—6)

This invention relates to soil builders useful in agriculture, and to methods of conditioning and fertilizing soils.

It is now commonly accepted by those trained in agricultural sciences that the mere application to the soil of concentrated plant nutriments, such as conventional chemical fertilizers, for example, that produced by reacting phosphate rock with sulphuric acid, will not necessarily insure satisfactory crop yields. In fact, it is becoming increasingly apparent that this manner of treating soils actually produces problems of major consequence, for example, progressively increasing soil deterioration which ultimately results in low crop yields despite the presence of quantities of actual plant food. Thus, more and more attention is being given to the addition to the soil, along with such chemical fertilizers, of various organic humus materials and materials containing elements found to be essential for proper plant growth, elements such as the rarer metals not present in ordinary soils except to a very minor extent and therefore soon depleted by intensive crop cultivation.

In keeping with this newer soil science, I have discovered that a material found abundantly in various parts of the world and in almost every state of the United States of America provides, when applied raw or when properly processed, an ideal soil builder for practically any type of soil. Such material is that commonly known as "oil shale," a naturally-occurring shale impregnated with an organic substance known as "kerogen," which latter consists of humic materials basically benzenoid in structure. I have found that this raw material, when finely ground to render its component elements available for agricultural purposes, provides a highly effective soil conditioner, and that, mixed with various nutritional and other active ingredients, it possesses great virtues as a fertilizer. Furthermore, I have found that, by proper processing, bacteria long dormant therein may be reactivated in much the same manner as described in my United States Letters Patent No. 2,310,652, issued February 9, 1943, with respect to bituminous coals and similar bituminous substances. In all its forms, this material has effective insecticidal qualities, which add considerably to its usefulness for the purposes of the invention.

Whether raw or heat processed, the material of this invention is granular in nature, and is outstanding in its free flowability and ability to retain moisture. The kerogen content greatly enhances availability for plant use of any phosphates ($P_2O_5$) applied in conjunction with the material or otherwise present in the soil. Furthermore, I have particularly noticed fixation of nitrogen by algae in rice fields, under the influence of an increased supply of $CO_2$ brought about by use of the material. In this connection, the heat-treated shale is preferred over the granualted raw shale. This same beneficial action has been observed on other crops, also.

An outstanding feature of the product is the fact that it is of natural origin, and is not acidulated as are ordinary commercial fertilizers.

The oil shales here referred to should not be confused with certain types of lignite commonly spoken of as "bituminous shales," for that material is entirely different from the shales impregnated with kerogen, properly classified as "oil shales." It is the latter material with which this invention deals.

A principal object of the invention is to provide a balanced soil builder for agricultural purposes, whether utilized in a form adapted primarily for physically conditioning the soil, or in a form adapted for both fertilizing and physically conditioning the soil.

An object is to provide such a soil builder in which known strains of beneficial bacteria may be incorporated, to the advantage of both the bacteria and the soil.

An object is to provide such a soil builder which has pronounced insecticidal qualities in addition to its soil building characteristics.

An object is to provide the above from a material which is available abundantly at moderate cost.

Further objects and features of the invention will become apparent from the following detailed description of presently preferred forms thereof.

Any variety of oil shale—shale impregnated with kerogen—may be utilized as the raw material for my new soil builder. These oil shales are found abundantly in Utah, Colorado, and Wyoming, but occur in many other States of the United States and in other parts of the world as well, for example, in Scotland. It is well established that the kerogen component of such shale is an organic residue left by the decomposition of plant and animal life, and to this I attribute much of the beneficial action of this material in supplying what may be termed artificial humus and in imparting insecticidal characteristics. The kerogen is intimately associated with and distributed throughout the shale components. These shales contain more or less, depending upon their origin, of the minor elements known to be essential to proper plant growth, for example, barium, vanadium, nickel, magnesium, copper, titanium.

A particular oil shale occurring abundantly in the State of Wyoming and found to be very satisfactory for my purposes has been analyzed by the U.S. Bureau of Mines, Salt Lake City, Utah, as follows:

"Mineralogically, the material is a dolomitic shale containing considerable organic material. The minerals identified in the shale are dolomite, clay, quartz, feldspar, pyrite, iron oxide, mica, calcite, and kerogen. Qualitative tests indicate the following elements are present: Al, Ca, Mg, Fe, Na, K, Si, S, Ti, C, and P as the principal constituents, whereas traces of Cu, Mn, Ni, Zr, Ba, and V were also found."

In order to render these oil shales applicable to the soil as a soil builder or fertilizer, I finely grind them to a mesh preferably between 80 and 150, which puts them in a granular or powdered condition, thereby enabling them to serve as artificial humus and to freely give up their vital constituents to the growing plants. When applied to the soil in this form, I have found these shales to have remarkable moisture-retaining characteristics, absorbing water and holding it available for plant use over considerable periods of time. Furthermore, the kerogen is effectively freed for action as an insecticide about the roots of the growing plants.

These finely ground oil shales are preferably intimately mixed with the soil as a conditioner prior to planting of vegetables, but may also be placed upon the surface adjacent the growing plants, or drilled into the soil with the seeds. They have no burning or corrosive action, and in most instances are perfectly harmless to plant life, even in excess quantities.

I have found that these finely ground oil shales create a rich environment for microbial activity, and, because of their kerogen content, stimulate ammonification and nitrification.

By way of demonstrating the beneficial results in soil treatment according to the teachings of my invention, I have employed carefully supervised growing experiments on test plots. Typical of the results obtained are the following: Upon appropriate ground on a well-recognized experimental farm in the State of Utah, standard plots were selected for the growing of sugar beets and corn. Under growing conditions identical, except for the addition of the soil-builder, the following results were obtained:

*Sugar beets*

Untreated soil—22 tons, 420 lbs. per acre
Soil treated with 250 lbs. per acre of raw ground shale of the type set forth in column 2 of this application—24 tons, 340 lbs. per acre

*Corn*

Untreated soil—10 tons, 48 lbs. per acre
Soil treated with 250 lbs. per acre of shale as above specified—12 tons, 875 lbs. per acre One feature of my invention is the mixing with the finely ground oil shale under suitable heat treatment of finely ground phosphate rock and, preferably also, of agricultural salt, whereby the tricalcium phosphate is wholly or in part rendered available as a plant food in the form of dicalcium and monocalcium phosphate. This chemical transformation occurs principally within the soil, and appears to be due to the reactivation within the oil shale of long dormant bacteria of the type disclosed in my afore-referred-to Patent No. 2,310,652.

The heat treatment referred to involves the subjection of the oil shale to heat which is preferably around 250 degrees F. and in no case above 310 degrees F. A highly advantageous procedure is to finely grind and thoroughly intermix both the phosphate rock and agricultural salt, and to heat the mixture to a temperature of approximately 800 degrees F. for approximately ten minutes, thereafter allowing it to cool to about 250 degrees F. and superimposing it as a bed upon the finely ground raw oil shale. This bedded material should be allowed to cool gradually, and then should be thoroughly intermixed.

Typical proportions of ingredients for the above procedure are as follows:

Rock phosphate _____ 1000 lbs. or 10 parts by weight
Oil shale _____ 700 lbs. or 7 parts by weight
Rock salt _____ 300 lbs. or 3 parts by weight I also obtain highly effective results by inoculating the above mixture with pure or mixed cultures of various known types of ammonifying and nitrifying bacteria. I have reason to believe that the presence of these bacteria has a stimulating effect upon the growth of the revitalized bacteria normally dormant in the oil shales. Furthermore, they hasten the natural ammonification and nitrification inherent in the material.

Peat or muck may be added as an ingredient of the product, and, where so added, the proportions of ingredients is advantageously as follows:

Rock phosphate _____ 750 lbs. or 7½ parts by weight
Rock salt _____ 250 lbs. or 2½ parts by weight
Oil shale _____ 700 lbs. or 7 parts by weight
Peat or muck _____ 300 lbs. or 3 parts by weight Instead of using phosphate rock and salt, or in addition thereto, mill tailings derived from the milling of metallic ores may be utilized to complement the mineral content of the oil shale. The relative proportions in these instances will depend upon the analysis of the raw oil shale, and upon the particular soils to which the mixture is to be applied.

For so much of the subject matter of application, Serial No. 89,805, filed April 29, 1949, now abandoned, and application, Serial No. 230,430, filed June 7, 1951, now abandoned, as is common to the present application, I claim the benefit of the priority of said applications.

While this invention is here described with respect to certain specific forms thereof, it is to be understood that various changes may be made therein and various other forms may be utilized on the basis of the teachings hereof, by those skilled in the art, without departing from the protective scope of the following claims.

I claim:

1. A process for preparing a soil builder comprising subjecting oil shale, whose constituents include shale and kerogen, to heat treatment at temperatures from approximately 250° F. to not more than 310° F. for only such time period as is sufficient to activate spore-bearing, gram-negative, non-motile, anaerobic rod bacteria normally dormant in said oil shale.

2. A process of preparing a soil builder comprising intimately mixing massed discrete particles of raw phosphate rock and of rock salt; heating said mixture to approximately 800 degrees F. for approximately 10 minutes; allowing the mixture to cool to approximately 250 degrees F.; bedding said cooled mixture upon a bed of massed discrete particles of an oil shale whose constituents include shale and kerogen; and thereafter mixing the bedded material.

3. The process recited in claim 2, wherein the relative proportions of ingredients are as follows:

| | Parts by weight |
|---|---|
| Rock phosphate | 10 |
| Rock salt | 3 |
| Oil shale | 7 |

4. The process recited in claim 2, wherein the mixture is innoculated with agriculturally-active bacteria.

5. The process recited in claim 2, including the addition to the mixture of a peat-like material.

References Cited in the file of this patent

UNITED STATES PATENTS

| 1,309,723 | Earp-Thomas | July 15, 1919 |
| 1,744,324 | McKee | Jan. 21, 1930 |
| 1,875,473 | McKee | Sept. 6, 1932 |
| 1,931,296 | Peter | Oct. 17, 1933 |
| 2,310,652 | Peter | Feb. 9, 1943 |

FOREIGN PATENTS

| 1,280 | Great Britain | May 24, 1859 |

OTHER REFERENCES

I. S. Veshenskaya: Chemical Abstracts, 3737, vol. 46, 1952.